United States Patent [19]

Lewis

[11] 4,371,903
[45] Feb. 1, 1983

[54] EMERGENCY HEAD RETRACT SYSTEM FOR MAGNETIC DISC DRIVES

[75] Inventor: Martyn A. Lewis, Pacific Palisades, Calif.

[73] Assignee: DMA Systems Corporation, Goleta, Calif.

[21] Appl. No.: 305,941

[22] Filed: Sep. 28, 1981

[51] Int. Cl.³ .......................... G11B 5/54; G11B 21/02
[52] U.S. Cl. ........................................ 360/75; 360/105
[58] Field of Search ........................... 360/75, 78, 105; 318/563, 687; 361/33

[56] References Cited

U.S. PATENT DOCUMENTS

| | | | |
|---|---|---|---|
| 3,473,099 | 10/1969 | Miller | 318/18 |
| 3,626,264 | 12/1971 | Halfhill et al. | 318/331 |
| 3,629,679 | 12/1971 | Halfhill | 318/563 |
| 3,956,766 | 5/1976 | Hanson et al. | 360/78 |
| 4,005,485 | 1/1977 | Opocensky | 360/75 |
| 4,237,501 | 12/1980 | Barmache et al. | 360/105 X |
| 4,241,366 | 12/1980 | Nishida et al. | 360/105 |

FOREIGN PATENT DOCUMENTS 2062932  5/1981  United Kingdom ............... 360/105

*Primary Examiner*—John H. Wolff
*Attorney, Agent, or Firm*—Spensley, Horn, Jubas & Lubitz

[57] ABSTRACT

In a disc drive including a disc having a magnetic surface and supported for rotation on a spindle, a spindle motor for driving the spindle, a linear motor having a positioner coil for radially moving a head support structure along the disc surface, and a circuit responsive to an emergency condition for causing the linear motor positioner coil to retract the head support structure, there is disclosed an improvement wherein the spindle motor is a rotating magnet DC motor and the kinetic energy stored in the rotating spindle mass is used to provide the energy required to unload the heads upon the occurrence of an emergency situation. Under emergency conditions, the spindle motor windings are switched directly to the linear motor positioner coil and the spindle motor acts as a generator to supply the head retract energy.

9 Claims, 2 Drawing Figures

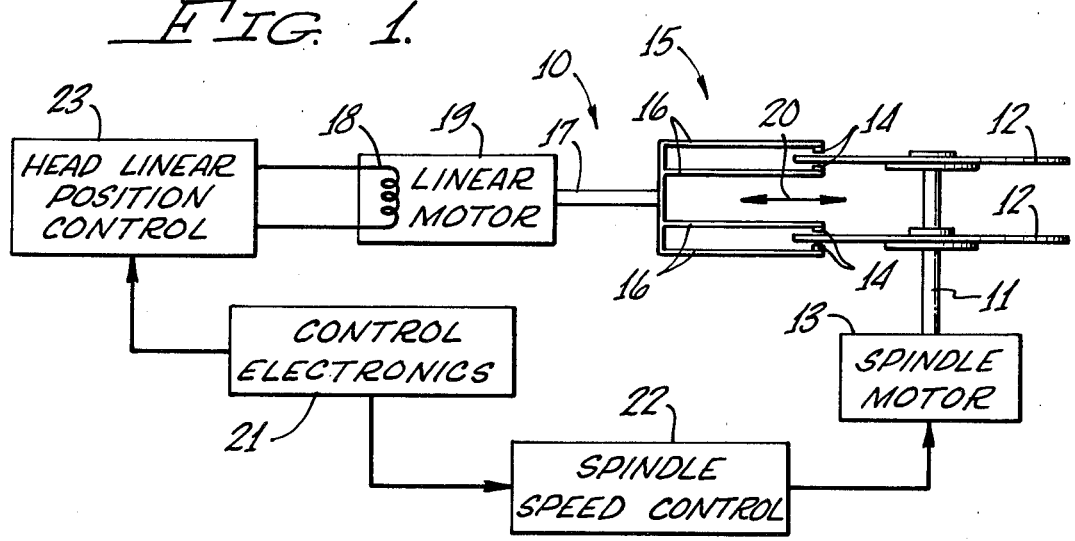
Fig. 1.
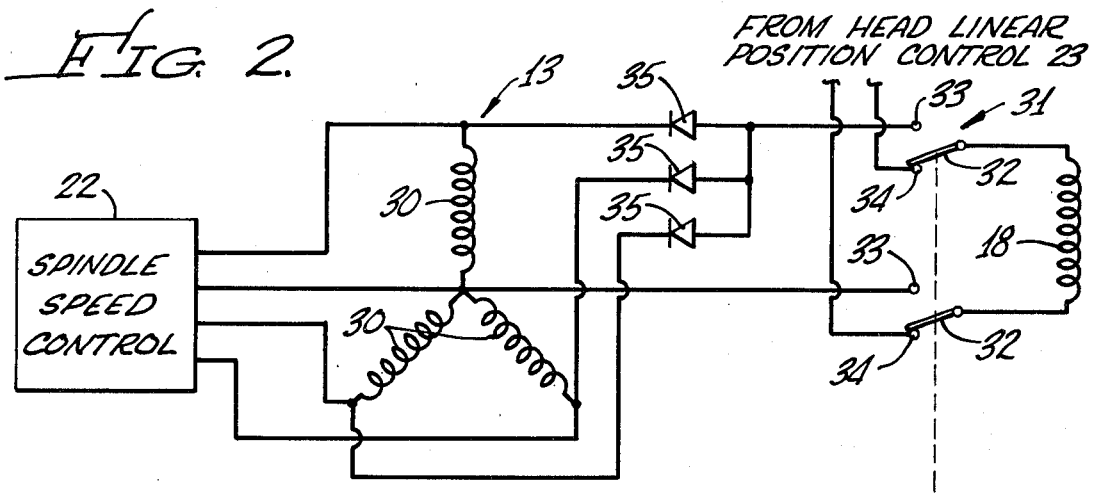
Fig. 2.
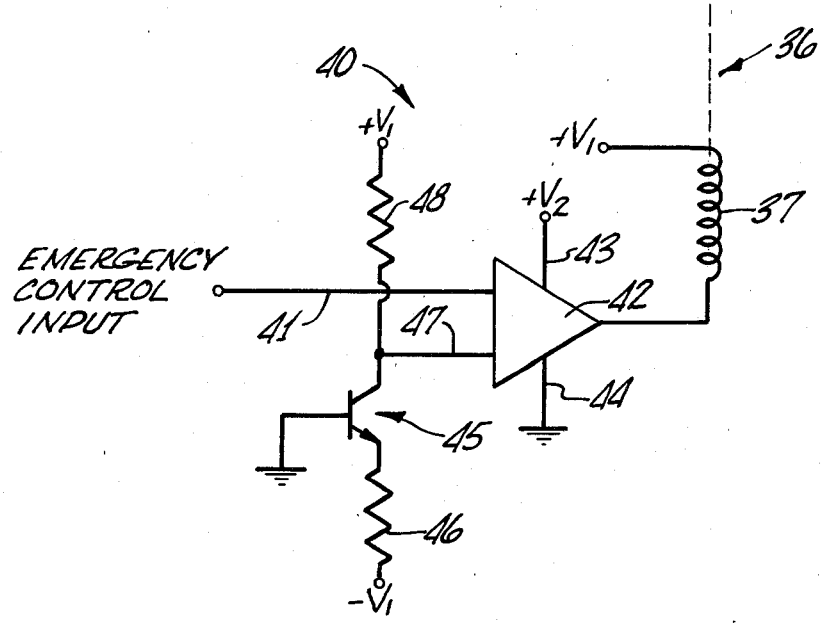

EMERGENCY HEAD RETRACT SYSTEM FOR MAGNETIC DISC DRIVES

BACKGROUND OF THE INVENTION

1. Field of the Invention

The present invention relates to an emergency head retract system for magnetic disc drives and, more particularly, to a system which takes advantage of the kinetic energy stored in a rotating spindle mass for providing the energy required to unload the heads in a disc drive in a power failure or other emergency situation.

2. Description of the Prior Art

Magnetic disc storage systems are widely used to provide large volumes of relatively low-cost, computer-accessible memory or storage. A typical disc storage device has a number of discs coated with a suitable magnetic material mounted for rotation on a common spindle and a set of transducer heads carried in pairs on elongated supports for insertion between adjacent discs, the heads of each pair facing in opposite directions to engage opposite faces of the adjacent discs. The support structure is coupled to a positioner motor, the positioner motor typically including a coil mounted within a magnetic field for linear movement and oriented relative to the discs to move the heads radially over the disc surfaces to thereby enable the heads to be positioned over any annular track on the surfaces. In normal operation, the positioner motor, in response to control signals from the computer, positions the transducer heads radially for recording data signals on, or retrieving data signals from, a pre-selected one of a set of concentric recording tracks on the discs.

The transducer heads are supported above the disc surfaces by a film of air to prevent contact therebetween which might otherwise damage one or both members. The heads are typically designed to actually fly above the disc recording surfaces at heights of less than 50 microinches. Irreparable damage can result from an electrical power failure which slows the discs and allows the heads to settle into contact with the discs' surfaces. As a result, it is imperative that the heads be withdrawn from the vicinity of the discs if the disc rotational speed is reduced substantially. It is also important, in a removable media disc drive, to insure that the heads are removed from the vicinity of the disc surfaces in the event of a power failure so that the disc can be removed from the system without damaging the heads.

The process of removing the heads from the discs in an emergency situation is referred to as an "emergency unload procedure" and requires the heads to be moved radially toward the discs' outer tracks and axially away from the disc surfaces. Although loss of power is probably the primary reason for initiating an emergency unload procedure, the procedure is typically also initiated when disc speed does not remain within tolerance, positioner error is detected, or write circuit faults that could affect stored data are detected.

Essentially, all modern disc drives incorporate some system for executing an emergency unload procedure in order to avoid loss of data and prevent disc and/or head damage. In a typical prior art emergency unload system, a capacitor is charged by the drive power supply during normal operation. Upon the detection of an emergency condition, a relay or equivalent switching means switches the capacitor across the positioner coil terminals to provide the electromotive force necessary to move the head support structure across the disc surfaces. Upon approaching the disc outer edge, the head support structure encounters a mechanical ramp which imparts an axial force to the support structure, thus unloading the heads from the discs. Systems of this type are described and claimed in U.S. Pat. Nos. 3,629,679 and 4,237,501.

Another approach is to supply stored energy for the emergency unload procedure by having a spring compressed and latched by the head positioning actuator. The spring latch is then released when a power failure occurs, providing the energy necessary to unload the heads. Such a system is exemplified by the apparatus of U.S. Pat. No. 4,005,485.

While both of these approaches work, they present a significant problem when attempting to reduce the size of a disc drive system. It is evident that a significant amount of mechanical energy is required to retract the head support structure which requires, in the case of a capacitor, a rather large capacitor. When using a spring, a fairly elaborate mechanical mechanism is required and, again, this takes up an undesirable amount of space.

SUMMARY OF THE INVENTION

According to the present invention, these problems are solved in a manner unknown heretofore. According to the present invention, large storage capacitors and complex mechanical retraction mechanisms are completely eliminated. In their place, a simple electrical circuit requiring an insignificant amount of space is provided, yet sufficient energy is available to unload the heads in a power failure or other emergency situation.

The present invention utilizes a rotating magnet DC motor as the spindle motor and takes advantage of the kinetic energy stored in the rotating spindle mass to provide the energy required to unload the heads in an emergency unload procedure. That is, in accordance with the preferred embodiment of the present invention, a rotating magnet DC motor is used to drive the spindle for normal operation. Under an emergency unload procedure, the motor stator windings are switched directly to the linear motor positioner coil and the DC motor is converted to a generator to supply the head retract energy.

Briefly, in a disc drive including a disc having a magnetic surface and supported for rotation on a spindle, a spindle motor for driving the spindle, a linear motor having a positioner coil for radially moving a head support structure along the disc surface, and circuit means responsive to an emergency condition for causing the linear motor positioner coil to retract the head support structure, there is disclosed the improvement wherein the spindle motor is a rotating magnet DC motor and wherein the circuit means comprises switch means operatively positioned between the stator windings of the DC motor and the linear motor positioner coil for selectively coupling the coil either to the circuitry which normally drives same or to the stator windings and relay means responsive to the emergency condition for operating the switch means.

OBJECTS, FEATURES & ADVANTAGES

It is therefore an object of the present invention to solve the space problems associated with circuit means responsive to an emergency condition for causing a drive motor to retract a head support structure in a disc drive. It is a feature of the present invention to solve these problems by utilizing the kinetic energy stored in the rotating mass of a spindle motor to provide the energy required to unload the heads in a power failure emergency situation. An advantage to be derived is the elimination of large storage capacitors. A further advantage is the elimination of complex mechanical retraction mechanisms. A still further advantage is the solution of the emergency retract problem with simple circuitry requiring minimal space.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a generalized block diagram of the electronic control system of a typical magnetic disc drive; and FIG. 2 is a circuit diagram of the preferred embodiment of the present invention.

DESCRIPTION OF THE PREFERRED EMBODIMENT

Referring now to the drawings and, more particularly, to FIG. 1 thereof, there is shown the components of a conventional magnetic disc drive, generally designated 10, which includes a spindle 11 supporting one or more magnetic discs 12. As is well known in the art, discs 12 may either be fixed to spindle 11 or user-replaceable. Spindle 11 is driven by a spindle motor 13 which rotates discs 12 about an axis defined by spindle 11.

As is well known in the art, discs 12 have a magnetic material coated on either one or both surfaces thereof to enable data to be magnetically recorded thereon. Data is recorded on the disc surfaces by signals applied to magnetic transducers 14, typically referred to as "heads." In a typical disc drive, a head support structure 15 is provided, structure 15 typically including, for each disc 12, a support arm 16, all of which arms 16 are connected to a common carriage 17. Carriage 17 is physically coupled to a positioner coil 18 of a linear positioner motor 19 which, in response to the application of positioning signals thereto, is capable of linearly moving support structure 15 in the direction of arrows 20. Support structure 15 is mounted relative to discs 12 so that heads 14 move radially with respect to the recording surfaces of discs 12. That is, support structure 15 can be moved linearly to enable heads 14 to be selectively positioned over any one of a plurality of annular recording tracks defined on the disc recording surfaces.

Magnetic disc drive 10 is typically controlled by control electronics 21 which forms no part of the present invention. Control electronics 21 controls the speed of spindle motor 13 via spindle speed control circuit 22 and controls the radial position of heads 14 via a head linear position control 23. The output of speed control circuit 22 is applied to spindle motor 13 whereas the output of position control circuit 23 is applied to coil 18 of linear motor 19. All of the above components of drive 10 are well known to those skilled in the art.

In normal operation, that is, when heads 14 are writing data onto or reading data from the surfaces of discs 12, heads 14 will be loaded. When heads 14 are loaded, it simply means that a spring force is acting upon heads 14, generally through support arms 16, to urge heads 14 toward the surfaces of discs 12. This force is counteracted by an air cushion caused by the rapid rotation of discs 12 so that heads 14 actually fly immediately above the disc recording surfaces, as long as discs 12 are rotating at a certain speed. In magnetic disc drives, the heads may fly at distances less than 50 microinches above the disc surfaces.

If, while heads 14 are positioned above the surfaces of discs 12, the disc speed happens to fall below a certain value, heads 14 can no longer fly and will crash onto the surfaces of discs 12. Obviously, this type of catastrophe is to be avoided and, as a consequence, most modern disc drives incorporate some type of emergency subsystem which senses a power fault or disc speed variation and unloads the heads prior to crashing. The process of unloading the heads generally requires that support structure 15 be retracted, that is, it should be moved to the left, as viewed in FIG. 1, in order to move heads 14 toward the outer-most annular track on the disc surface. Such a disc drive also incorporates means for moving heads 14 axially away from disc 12 as the retract process is completed.

Referring now to FIG. 2, the present emergency retract system may be best understood. According to the preferred embodiment of the present invention, spindle motor 13 is a rotating magnet DC motor including stationary stator windings 30 arranged in a conventional three-phase configuration and a permanent magnet rotor (not shown). Stator windings 30 are coupled to the output of spindle speed control circuit 22. In normal operation, circuit 22 provides drive signals to windings 30 to cause the rotating magnet assembly to rotate at high speed.

The present invention takes advantage of the fact that a rotating magnet DC motor, like essentially all other motors, can also function as a generator. That is, if the rotor is driven, windings 30 will generate an emf which is an AC signal, the voltage and frequency of which are proportional to the speed of spindle 11. At the moment of the sensing of an emergency situation, there is still a significant amount of kinetic energy in the rotating spindle assembly so that if motor 15 is switched into a generator configuration, this emf may be utilized to provide the energy required to unload heads 14.

According to the present invention, a switch, generally designated 31, is positioned between head linear position control 23 and coil 18 of linear motor 19 and is further connected to stator windings 30. That is, switch 31 has a pair of movable arms 32 connected to coil 18 and pairs of contacts 33 and 34. Contacts 34 are connected to head linear position control 23. One of contacts 33 is connected to the center tap of windings 30 whereas the other contact 33 is connected to one or more of windings 30 via diodes 35. When converted to a generator, windings 30 produce an AC signal. Diodes 35 rectify this AC signal and produce a pulsating DC voltage which is applied across contacts 33.

Switch contacts 32 are part of a relay 36, which also includes a coil 37. Relay 36 is arranged so that arms 32 normally engage contacts 33 and only when coil 37 is energized are arms 32 brought into engagement with contacts 34. In other words, when coil 37 is energized, coil 18 of linear motor 19 receives the normal positioning signals from head linear position control 23. On the other hand, in the event of an emergency situation, where coil 37 is de-energized, arms 32 are moved into engagement with contacts 33. At such time, the pulsating DC voltage from diodes 35 is applied to positioner coil 18 of linear motor 19. A correct selection of the polarity causes linear motor 19 to move carriage 17 in the retract direction.

The present emergency condition sensing circuit, generally designated 40, has a particular implementation based upon the types of inputs which the present magnetic disc drive 10 contains and such implementation will now be described in detail. However, it will be obvious to those skilled in the art that the implementation disclosed is one of many possible implementations which are clearly within the scope of the present invention.

The present implementation of magnetic disc drive 10 includes three DC power supplies, designated $+V_1$, $+V_2$, and $-V_1$, for controlling the various components within disc drive 10. Circuit 40 is designed to sense the loss of any of these power supplies, as well as other emergency conditions, such as disc speed falling below a certain value. Accordingly, an emergency control input is derived from control electronics 21 over a line 41.

More specifically, one end of coil 37 is connected to $+V_1$ whereas the other end thereof is connected to the output of an integrated circuit 42 functioning as an OR gate. OR gate 42 receives power over line 43 from $+V_2$ and has another input connected via a line 44 to circuit ground. One input of circuit 42 is derived over line 41 from control electronics 21.

$+V_2$ is connected via a resistor 48 to the collector of a transistor 45. The collector of transistor 45 is also connected to the other input of circuit 42 on line 47. The base of transistor 45 is connected to circuit ground and its emitter is connected via a resistor 46 to $-V_1$.

In operation, the emergency control input on line 41 is normally low, as is the input to circuit 42 on line 47. In other words, with body $+V_2$ and $-V_1$ active, transistor 45 is on and the collector thereof is connected to ground via transistor 45. In the presence of $+V_2$, circuit 42 has internal power and connects the output terminal thereof to ground, permitting current to flow from $+V_1$ through coil 37. Arms 32 are brought into engagement with contacts 34 so that the normal operation of magnetic disc drive 10 proceeds.

On the other hand, any of four emergency conditions will deenergize coil 37, causing arms 32 to engage contacts 33 and connecting the output of spindle motor 13 to coil 18 of linear motor 19 to retract heads 14. That is:

(1) If $+V_1$ is lost, the power supply for relay coil 37 is lost and coil 37 is de-energized;

(2) If the emergency control input on line 41 goes high, circuit 42 is activated, becoming an open circuit, terminating the flow of current through coil 37 and coil 37 is de-energized;

(3) If $-V_1$ is lost, transistor 45 turns off, line 47 goes high and circuit 42 becomes an open circuit, terminating current through coil 37 and coil 37 is de-energized; and (4) If $+V_2$ is lost, circuit 42 becomes an open circuit due to the loss of voltage internal to the circuitry therein, terminating current through coil 37 and coil 37 is de-energized.

Thus, in any of the above cases, coil 37 is de-energized and the kinetic energy stored in the rotating spindle assembly provides the energy required to unload heads 14 from discs 12.

While motor 19 has been described as being a linear motor, since such is the preferred embodiment of the present invention, it need not be such. Other types of motors are well known for moving support structure 15, such as swing arms, lead screw types, and the like, and the present invention is equally applicable to such other types. On the other hand, motor 19 must be a DC type device for the present invention to work, thereby excluding stepper motors and the like.

Furthermore, while spindle motor 13 has been described as being a rotating magnet DC motor, since such is the simplest implementation of the present invention, it need not be such. Other types of motors are capable of being used as a spindle motor and as a generator, such as a fixed magnet, moving coil motor or a wound field motor.

It can, therefore, be seen that, according to the present invention, the problems encountered heretofore in providing an emergency retract system are solved in a unique manner. According to the present invention, large storage capacitors and complex mechanical retraction mechanisms are completely eliminated. In their place, a simple electrical circuit 40, requiring an insignificant amount of space, is provided, yet sufficient energy is available to unload the heads in a power failure or other emergency situation.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. In a disc drive including a disc having a magnetic surface and supported for rotation on a spindle, at least one magnetic head movable relative to said disc surface, a spindle motor for driving said spindle, a head support structure coupled to said head, a drive motor having a positioner coil for moving said head support structure so as to move said head along said disc surface, and circuit means responsive to an emergency condition for causing said drive motor positioner coil to retract said head support structure, the improvement wherein said spindle motor is a rotating magnet DC motor and wherein said circuit means comprises:

switch means operatively positioned between the stator windings of said DC motor and said drive motor positioner coil for selectively coupling said coil either to the circuitry which normally drives same or to said stator windings; and means responsive to said emergency condition for operating said switch means.

2. In a disc drive according to claim 1, the improvement further comprising:

rectifier means operatively positioned between said stator windings of said DC motor and said switch means for converting the AC signal from said spindle motor into a pulsating DC voltage for application to said drive motor positioner coil.

3. In a disc drive according to claim 1 or 2, wherein at least one power supply operates said disc drive and wherein said switch means operating means includes relay means responsive to said power supply for normally coupling said drive motor positioner coil to said circuitry which normally drives same, said relay means being automatically responsive to the loss of said power supply for operating said switch means so as to couple said coil to said stator windings.

4. In a disc drive according to claim 1 or 2, wherein multiple power supplies operate said disc drive and wherein said switch means operating means includes relay means responsive to said power supplies for normally coupling said drive motor positioner coil to said circuitry which normally drives same, said relay means being automatically responsive to the loss of any one of said power supplies for operating said switch means so as to couple said coil to said stator windings.

5. In a disc drive including a disc having a magnetic surface and supported for rotation on a spindle, at least one magnetic head movable relative to said disc surface, a spindle motor for driving said spindle, a head support structure coupled to said head, a drive motor for moving said head support structure relative to said disc surface, and circuit means responsive to an emergency condition for causing said drive motor to withdraw said head support structure from said disc surface, the improvement wherein said circuit means comprises:
switch means operatively positioned between the stator windings of said spindle motor and said drive motor for selectively connecting said drive motor to said stator windings; and
means responsive to said emergency condition for operating said switch means.

6. In a disc drive according to claim 5, the improvement wherein said spindle motor is a rotating magnet DC motor.

7. In a disc drive including a disc having a magnetic surface and supported for rotation on a spindle, at least one magnetic head movable relative to said disc surface, a spindle motor for driving said spindle, a head support structure coupled to said head, a drive motor for moving said head support structure so as to move said head along said disc surface, and circuit means responsive to an emergency condition for causing said drive motor to withdraw said head support structure from said disc surface, said spindle motor being a rotating magnet DC motor, the method comprising:
connecting the stator windings of said spindle motor to said drive motor in the presence of an emergency condition so as to utilize the kinetic energy stored in the rotating spindle assembly of said spindle motor as the energy for withdrawing said head support structure upon the occurrence of an emergency condition.

8. In a disc drive according to claim 7, the method wherein said connecting step comprises:
providing a switch means operatively positioned between the stator windings of said DC motor and said drive motor positioner coil for selectively coupling said coil either to the circuitry which normally drives same or to said stator windings; and
operating said switch means in response to said emergency condition.

9. In a disc drive according to claim 8, the method further comprising:
rectifying the AC signal from said DC motor into a pulsating DC voltage for application to said drive motor.

* * * * *